United States Patent [19]  [11] 4,046,863
Kobayashi et al.  [45] Sept. 6, 1977

[54] PROCESS FOR THE PRODUCTION OF SHAPED ARTICLES OF HIGH DENSITY GRAPHITE

[75] Inventors: Kazuo Kobayashi, Kurume; Ichitaro Ogawa, Yame; Hidemasa Honda, Tosu; Yasuhiro Matsushita, Higashiosaka, all of Japan

[73] Assignee: Director-General of the Agency of Industrial Science and Technology, Tokyo, Japan

[21] Appl. No.: 601,609

[22] Filed: Aug. 4, 1975

[30] Foreign Application Priority Data

Aug. 29, 1974 Japan ............................. 49-99622

[51] Int. Cl.$^2$ ............................................. C01B 31/04
[52] U.S. Cl. ................................. 423/448; 252/502; 264/29.3
[58] Field of Search .................... 423/448, 445, 449; 264/29; 106/56; 252/502, 478

[56] References Cited

U.S. PATENT DOCUMENTS

| 2,949,430 | 8/1960 | Jorgensen | 252/502 |
| 2,987,488 | 6/1961 | Clark | 106/56 |
| 2,997,744 | 8/1961 | Stoddard et al. | 423/448 X |

*Primary Examiner*—Edward J. Meros
*Attorney, Agent, or Firm*—William J. Daniel

[57] ABSTRACT

A process for the production of shaped articles of high density graphite having excellent mold-releasing property which comprises incorporating amorphous carbon powder such as powdery coke or artificial graphite powder with about 3–20% by weight of boric acid or boron oxide as a sintering-promoting agent, and baking the mixture under a pressure of 150–500 kg/cm$^2$ without the aid of a binding agent such as pitch. Shaped articles of high density graphite possessing excellent mechanical strength are obtained by this process.

4 Claims, 2 Drawing Figures

PROCESS FOR THE PRODUCTION OF SHAPED ARTICLES OF HIGH DENSITY GRAPHITE

BACKGROUND OF THE INVENTION

The present invention relates to a process for the production of shaped articles of high density graphite having excellent moldreleasing property which comprises incorporating amorphous carbon powder or artificial graphite powder with several percents by weight of boric acid or boron oxide as a sintering-promoting agent and baking the mixture under a pressure of several hundred kg/cm$^2$ without the aid of any binding agent such as pitch.

At the present time, the production of shaped articles of high density graphite is an important research objective and is attacked by a variety of processes. Attempted hitherto are a process wherein a device is used for carbonaceous materials or binding agents such as pitch to be incorporated thereinto to increase the carbonization rate and contraction by graphitization is promoted to obtain high density products, a process wherein a carbonaceous material is sintered under pressure to increase the carbonization rate of a binding agent and contraction of the material is effected on sintering to obtain high density products, a process wherein a sintered material is impregnated with a liquid hydrocarbon and then the impregnated material is sintered to clog pores of the material for obtaining high density products, a process wherein a sintered material is permeated with a gaseous hydrocarbon and then the permeated material is heated to effect pyrolysis of the gaseous hydrocarbon in the internal pores of the material for clogging the pores, and a process wherein a sintered material is graphitized under mechanical pressure to effect collapse of pores in the material by creeping. In these processes, the products are produced from a starting material containing a binder. A process wherein a carbonaceous material is sintered under ultrasuperatmospheric pressure is also attempted as a process using no binder.

However, these prior art processes using a binder require complicated and/or costly operations. It is considerably difficult to produce products having a bulk density of at least 1.9 following to these processes and, when posible at all, the products will be expensive.

On the other hand, the process wherein sintering of a carbonaceous material is effected under ultra-superatomospheric pressure in the absence of a binder requires an extremely high pressure of about several ten thousand atoms and is unable to produce large-sized products on account of the limited capacity of the pressure apparatus. Thus, there is a great demand for developing a process for producing shaped articles of high density graphite in a simple manner.

BRIEF SUMMARY OF THE INVENTION

Accordingly, it is an object of the present invention to provide a process for the production of shaped articles of high density graphite wherein a binder such as pitch is not used.

It is another object of the present invention to provide a process for the production of shaped articles of high density graphite having excellent mold-releasing property from a graphite mold.

It is still another object of the present invention to provide a process for the production of shaped articles of high density graphite possessing high mechanical strength.

It is further object of the present invention to provide a process wherein shaped articles of graphite having a desired degree of graphite are obtained by treating the carbonaceous material at a temperature about several hundred degree C lower than the treating temperatures in the prior art processes.

It is still further object of the present invention to provide a process for the production of shaped acticles of high density graphite having excellent oxidation-resisting property.

Other and further objects, features and advantages of the present invention will be apparent from the following description taken in connection with the accompanying drawing, wherein.

DETAILED DESCRIPTION OF THE INVENTION

Figure 1:
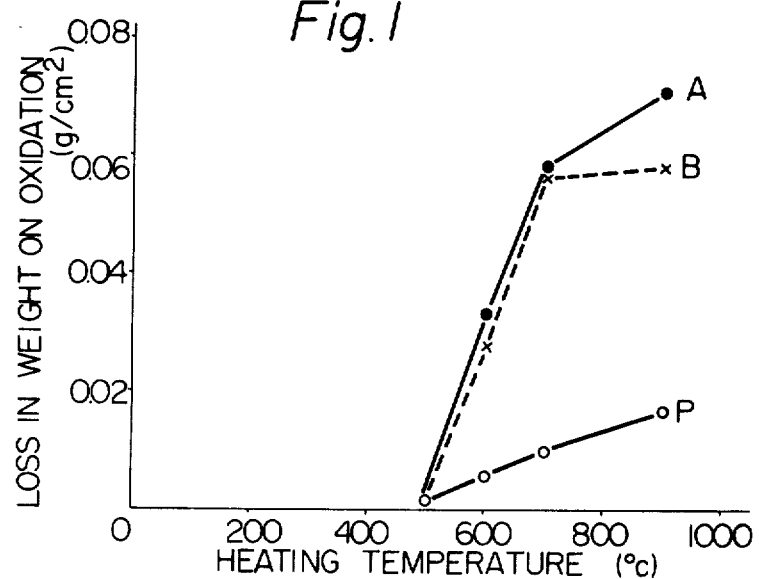
FIG. 1 is a graph showing the relation between the heating temperature and the loss in weight on oxidation in a test using the shaped articles of high density graphite of the present invention and commercially available shaped articles of high density graphite.

As a result of many studies made for developing a process for easily producing shaped articles of high density graphite without necessity of any binder such as pitch used in the prior art processes, it has now been found that the above mentioned purpose can be attained only by incorporating a carbonaceous material with several percent by weight of boric acid or boron oxide as a sintering-promoting agent. The present invention has been accomplished on the basis of the above finding.

In accordance with the present invention, there is provided a process for the production of shaped articles of high density which comprises incorporating amorphour carbon powder or artificial graphite powder with boric acid or boron oxide as a sintering-promoting agent and then baking the mixture under pressure.

In the prior art processes, carbonaceous products are generally manufactured by mixing and kneading an aggregate with a binder, shaping the mixture and then subjecting the shaped article to a heat treatment. Exclusion of a binder such as pitch or tar from the carbonaceous composition as contemplated in the present invention is not only effective for omission of the step for kneading the aggregate with the binder but also desirable from the viewpoint of environmental hygienics which is an especially sensitive problem in recent years. Thus, development of a process for producing carbonaceous products without the aid of any binder has long been demanded in the related fields of industry.

According to the present invention, amorphous carbon powder or artificial graphite powder free of any binder is mixed with an aqueous solution of boric acid containing a given amount of boron oxide to the starting carbonaceous powder and then the mixture was thoroughly stirred and dried. Alternatively, the starting carbonaceous powder is mixed with a given amount of boron oxide powder and the mixture was throughly stirred. The proportion of boric acid or boron oxide in the mixture is 3–30% by weight, with 5–20% by weight being preferable.

The starting carbonaceous powder thus incorporated with boric acid or boron oxide is then charged into a graphite mold and sintered under pressure whereby a shaped article of high density graphite which can easily be released from the graphite mold is obtained. The pressure used for compression of the mold is selected within the range of 100-500 kg/cm$^2$, preferably 150-300 kg/cm$^2$. A sintering temperature as high as 2000° C is sufficient for this purpose but a temperature ranging from 1600° to 2200° C is preferable for the case of using amorphous carbon powder while a temperature ranging from 2000° to 2500° C is preferable for the case of using artificial graphite powder. If products with a high degree of graphitization are desired, the carbonaceous material is desirably sintered at a higher temperature. The sintering treatment conducted under pressure requires the use of an inert atmosphere or a reducing atmosphere.

The amorphous carbon used in the present invention is a general term of carbon allotropes devoid of a distinct crystalline state and includes various kinds of carbon of natural origin other than diamond and graphite, as well as various kinds of artificially made carbon such as gas carbon, soot, charcoal, animal carbon, resin carbon and coke. No special limitation exists in the artificial graphite utilizable in the present invention. Artificial graphite prepared according to a usual method is adequate for the purpose of the present invention. Illustrative of such artificial graphite powder are graphitized powder obtained by baking amorphous carbon such as coke powder at above 1500° C and dried powder of commercially available artificial graphite material.

Incorporation of the carbonaceous material with a small amount of boric acid or boron oxide is one of the most characteristic features of the present invention. Shaped articles of high density graphite having a bulk density of at least 2.0 and high mechanical strength can be obtained according to the above characteristic features. If boric acid or boron oxide is not added, no sintering phenomenon takes place among the mutual carbonaceous powders.

It is another characteristic feature of the present invention that the graphitization rate of the carbonaceous powder in increased by incorporation of boric acid or boron oxide thereinto. The products obtained according to the process of the present invention have a degree of graphitization remarkably higher than that of the products obtained according to the prior art processes by a heat treatment conducted at the same temperature as in the present invention. The products of the present invention rank with the product obtained according to the prior art processes by a heat treatment conducted at a temperature higher than the treating temperature of the present invention by several hundred degree C. In other words, it is an advantage of the present invention that the present invention not only warrants the production of shaped articles of high density graphite but also enables one to produce graphite products having a desired degree of graphitization at a sintering temperature about several hundred degree C lower than the treating temperature in the prior art processes.

In general, when the carbonaceous powder is sintered while compressing it in a graphite mold, adhesion often takes place between the mold and the sintered product. Thus, a troublesome operation for releasing the product from the mold is often required after the sintering treatment. According to the present invention, however, the product can perfectly be released from the mold without permitting adhesion. This point is another advantage of the present invention.

The shaped articles of high density graphite obtained by the present invention can be baked again in a conventional graphitizing furnace to enhance the mechanical strength and the degree of graphitization.

The present invention will now be illustrated in more detail by way of examples which are included merely to aid in the understanding of the invention. Many variations may be made by one skilled in the art without departing from the spirit and scope of the invention.

EXAMPLE 1

A calcined pitch coke powder was dipped into an aqueous solution of boric acid containing 8% by weight of boron oxide based on the starting powder. The mixture was thoroughly stirred, dried by heating and then pulverized in an agate mortar. 2.3 Grams of the powder was charged in a cubic graphite mold (size: 15 × 55mm) and heated in an inert atmosphere by means of high frequency induction heating at a temperature elevation rate such that 45 minutes were required to elevate the temperature up to 2200° C while compressing the mold under a pressure of 200 kg/cm$^2$. The content was maintained for 20 minutes and then cooled to room temperature whereby a shaped article of high density graphite was obtained which was excellent in mold-releasing property and mechanical strength and had a bulk density of 2.05, a lattice constant ($C_0$) of 6.742A, a compression strength of 700 kg/cm$^2$ and a flexural strength of 400 kg/cm$^2$.

EXAMPLE 2

A calcined pitch coke powder was incorporated with boron oxide powder in an amount of 5% by weight based on the starting carbonaceous powder and 2.3 g of the mixture was charged into a cubic graphite mold (size: 15 × 15mm), heated in an inert atmosphere by means of high frequency induction heating at a temperature elevation rate such that 30 minutes were required to elevate the temperature up to 2400° C while compressing the mold under a pressure of 250 kg/cm$^2$, maintained for 20 minutes and then cooled to room temperature whereby a shaped article of high density graphite was obtained which was excellent in mold-releasing property and mechanical strength and had a bulk density of 2.02, a lattice constant ($C_0$) of 6.740A, a compression strength of 600kg/cm$^2$ and a flexural strength of 350 kg/cm$^2$.

EXAMPLE 3

Artificial graphite powder was dipped into an aqueous solution of boric acid containing 8% by weight of boron oxide based on the starting powder and the mixture was dried by heating under vigorous agitation. 2.3 Grams of the dried mixture were charged into a cubic graphite mold having a size of 15 × 15mm and heated in an inert atmosphere by means of high frequency induction heating at a temperature elevation rate such that 30 minutes were required to elevate the temperature up to 2200° C while compressing the mold under a pressure of 200 kg/cm$^2$, maintained for 30 minutes and then cooled whereby a shaped article of high density graphite was obtained which was excellent in mold-releasing property and had a bulk density of 1.98 and lattice constant ($C_0$) of 6.734A.

EXAMPLE 4

A calcined petroleum coke powder was dipped into an aqueous solution of boric acid containing 8% by weight of boron oxide based on the starting powder and the mixture was dried by heating under vigorous agitation. When 2.3 g of the dried mixture were subjected to a heat treatment conducted under pressure in the same manner as described in Example 1, a shaped article of high density graphite was obtained which was excellent in mold-releasing property and mechanical strength and had a bulk density of 2.0, a lattice constant ($C_0$) of 6.740A, a compression strength of 800kg/cm$^2$ and a flexural strength of 500 kg/cm$^2$.

EXAMPLE 5

The shaped article of high density graphite obtained in Example 1 was heated at 2500° C in an ordinary Tammann crucible and maintained for one hour to enhance the mechanical property, whereby a shaped article of high density graphite improved in the properties was obtained which had a bulk density of 2.07, a lattice constant of 6.734A, a compression strength of 800 kg/cm$^2$ and a flexural strength of 500 kg/cm$^2$.

EXAMPLE 6

A calcined pitch coke powder was immersed in an aqueous solution of boric acid containing 10% by weight of boron oxide based on the starting powder and the mixture was dried by heating under vigorous agitation. The powdery mixture thus obtained was charged into a cubic graphite mold having a dimension of 50 × 30 × 10mm, heated up to 2000° C while compressing the mold under a pressure of 200 kg/cm$^2$ and maintained for 90 minutes.

A shaped article of high density graphite was thus obtained which was excellent in mold-releasing property and mechanical strength and had a bulk density of 2.14, a lattice constant ($C_0$) of 6.725A, a compression strength of 1300 kg/cm$^2$ and a flexural strength of 900 kg/cm$^2$.

Figure 2:
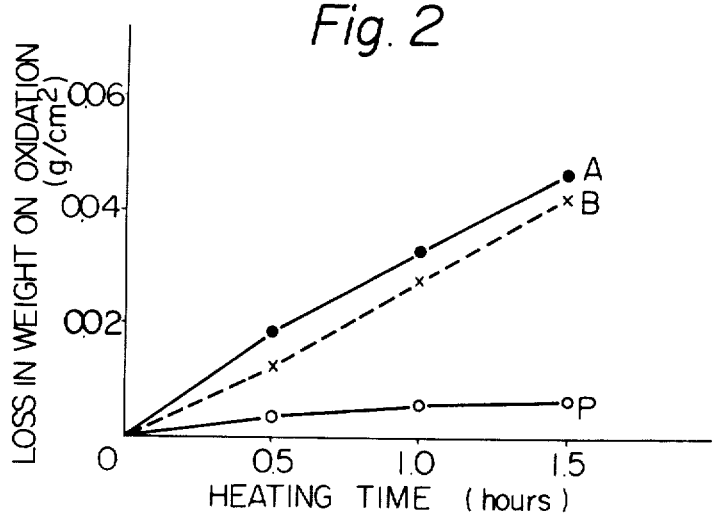
FIG. 2 is a graph showing the relation between the heating time and the loss in weight on oxidation in a test using the shaped articles of high density graphite of the present invention and commercially available shaped articles of high density graphite.

The oxidation characteristics in the air of the shaped article of high density graphite thus obtained were compared with those of two commercially available shaped articles of high density graphite (Products A and B made in Japan) and a result obtained was as shown as FIGS. 1 and 2. FIG. 1 is a graph showing loss in weight by oxidation of the samples heated at a given temperature for one hour while FIG. 2 is a graph showing loss in weight on oxidation of the samples heated for a given period of time at 600° C. In these graphs, Curve P stand for the product of the present invention and Curbs A and B for the commercially available products A and B. As is evident from the graphs, the product of the present invention is very superior in oxidation-resisting property of the product to the commercially available products. The bulk density, specific electric resistance and flexural strength of the product of this invention are shown in the following table in comparison with those of the commercially available products.

| Sample | Bulk density | Specific electric resistance ($\mu\Omega$-cm) | Flexural strength (kg/cm$^2$) |
|---|---|---|---|
| Product A | 1.74 | 1050–1070 | 350 |
| Product B | 1.65 | 900–1100 | 300 |
| The product of the present invention | 2.1 | 630–700 | 900 |

The table obviously shows that the shaped articles of high density graphite which have high flexural strength and low specific electric resistance can be obtained according the present invention under a relatively low pressure.

What is claimed is:

1. A process for producing shaped articles of graphite having a density of at least about 2.0 comprising the steps of forming a generally uniform mixture of finely divided amorphous carbon or synthetic graphite and boric acid or boron oxide in an amount equal to about 3–30% by weight of the mixture, shaping said mixture into a given shape, and baking the mixture in the absence of a pitch binder to a temperature of at least about 2000° C while under a pressure of at least about 100 kg/cm$^2$.

2. A process according to claim 1 wherein said amorphous carbon powder is at least one selected from the group consisting of gas carbon, soot, charcoal, animal carbon, resin carbon and coke powder.

3. A process according to claim 2 wherein said coke powder is at least one of calcined pitch coke powder and calcined petroleum coke powder.

4. The process of claim 1 wherein said pressure is in the range of about 150–300 kg/cm$^2$.

* * * * *